US005078214A

United States Patent [19]

Holley

[11] Patent Number: 5,078,214

[45] Date of Patent: Jan. 7, 1992

[54] METHOD OF AMELIORATION OF SOIL FOR TREE PLANTING

[75] Inventor: Michael N. H. Holley, Broadmoor, South Africa

[73] Assignee: Holley Brothers (PTY) Limited, P O Wartburg, South Africa

[21] Appl. No.: 510,056

[22] Filed: Apr. 17, 1990

[30] Foreign Application Priority Data

Apr. 24, 1989 [ZA] South Africa ........ 89/2992

[51] Int. Cl.[5] ........ A01B 79/00

[52] U.S. Cl. ........ 172/1; 172/23; 294/107; 111/900

[58] Field of Search ........ 172/1, 23; 111/200, 111/900; 37/2 R, 2 P, 120, 121, 195; 294/107

[56] References Cited

U.S. PATENT DOCUMENTS

| | | | |
|---|---|---|---|
| 11,242 | 7/1854 | Taggart | 37/2 R |
| 1,956,697 | 8/1932 | Rognerud | 111/900 |
| 2,622,915 | 12/1952 | Horn | 294/107 |
| 2,639,937 | 5/1953 | Billings | 294/107 |
| 3,038,620 | 6/1962 | Collin | 294/107 |
| 3,193,319 | 7/1965 | Frock et al. | 294/107 |
| 3,618,670 | 11/1971 | Alberto | 172/60 |
| 4,088,163 | 5/1978 | Levesque | 37/2 R |
| 4,123,861 | 11/1978 | Hemphill | 37/195 |
| 4,517,755 | 5/1985 | Nicholsen | 37/2 R |
| 4,602,444 | 7/1986 | Endo | 37/2 R |

FOREIGN PATENT DOCUMENTS

| | | | |
|---|---|---|---|
| 895306 | 1/1982 | U.S.S.R. | 111/900 |
| 1007562 | 3/1983 | U.S.S.R. | 172/1 |

OTHER PUBLICATIONS

British Columbia Lumberman, "Wanted: A Scarifier Producer", Paul Mac Donald, Jun. 1985.

Robson Valley Couvier, "Newsite Preparation Equipment Tested Near McBride", Oct. 16, 1986.

*Primary Examiner*—Dennis L. Taylor

*Assistant Examiner*—Spencer Warnick

*Attorney, Agent, or Firm*—Myers & Assoc.

[57] ABSTRACT

A method of preparing land for tree planting includes the step of ameliorating small zones of the land required for planting. These zones may be between the rows of stumps after tree felling and are of the order of one meter square and 25 to 75 cms deep. The zones are ameliorated by grabbing a volume of soil in selected zones, which disturbs the soil in those zones, and allowing it, in an ameliorated state, to re-occupy that volume.

3 Claims, 4 Drawing Sheets

METHOD OF AMELIORATION OF SOIL FOR TREE PLANTING

FIELD OF THE INVENTION

This invention relates to a method of and apparatus for amelioration of soil, and in particular for the amelioration of soil for tree planting, and further in particular for tree planting after tree-felling, or harvesting of either natural or managed forest units or areas.

In this specification the term "amelioration" is intended to mean disturbance of soil with concomitant decompaction, aeration, and tilth for the development of the plants.

BACKGROUND OF THE INVENTION

Traditional methods of land peparation for tree planting include hand-pitting or mechanical tillage, ripping along the plant line on or between stumps, discing, stump chipping and ploughing,and/or bulldozing.

The trend is to the maximum possible soil amelioration within the limits of factors such as terrain, soil type and condition, previous crops, soil conservation practice, and equipment utilization within these limitations.

It is an object of the present invention to provide a method and apparatus for maximum soil amelioration and, in so far as re-planting of a plantation or forest is concerned, a minimum of stump removal and risk of soil erosion and other deleterious environmental factors; and at the same time to provide apparatus of minimum cost for the purpose indicated. In this specification the term "plantation" is intended to include natural or man-made forests.

THE INVENTION

According to the invention a method of preparing land for tree planting includes the steps of ameliorating a number of separate zones in a desired formation, for the planting of seedlings in such zones.

In a preferred form of the invention the method is used to prepare the plant zones for re-planting a plantation after tree-felling, the zones being located between the stumps, and may be arranged in rows as in the plantation felled in accordance with standard practice or within any of the limitations imposed on the utilisation of wheeled or tracked vehicle or field conditions.

However, it will be appreciated that the invention may also be applied to the formation of a new plantation and the same considerations may be applied.

The zones are preferably prepared by grabbing the soil in the selected zones, these zones being in area of the order of 1 meter square and in depth of the order from 25 to 75 cm. The grabbing action is calculated to disturb the soil in that volume, and to allow it, in an ameliorated state, to re-occupy that volume.

Further according to the invention apparatus for carrying out the method includes opposing tines which are adapted to move in between a closed position and an open position, the tines being articulated or hinged for such movement. The tines may be hydraulically operated for adequate penetration of the tines into the soil.

The tines may take the form of claws, grapples or the like and in operation are located on the selected zone of ground and actuated towards their closed position when the volume of soil is grabbed thereby disturbing the soil with concomitant amelioration. The volume of soil may be elevated by raising the closed tines and then released by opening the tines for the soil to fall back into the cavity formed. The process may be repeated until the desired degree of amelioration is achieved.

This soil is sufficiently ameliorated for planting of a cutting, slip or seedling. An important advantage of the invention over conventional tillage procedures is that it allows for the minimum removal of forest or crop residue in order to provide maximum tilth necessary while retaining the stabilization of the surrounding area.

An important advantage of the invention is the utilisation of far lighter and more cost-effective methods and apparatus for amelioration of soil between rows of stumps.

In a refinement of the invention the tine design is adapted for efficient penetration of the soil profile, loosening and lifting of the soil particles resulting in optimum amelioration. A time having a convex upper surface and concave lower surface (in the open position of the tines) is recommended to achieve this result. As the apparatus is lowered and the tines are actuated towards their closed position, the tip of the tines will move in an eccentric path thereby improving the amelioration.

In a further refinement of the invention, the upper surface (in the open position) has a transverse web formation which , as the time moves through the soil, exerts a beneficial lift to the soil. Such a wed may taper from the pivot towards the tip of the tine. A pair of tines having such a wed may be provided and in yet a further refinement of the invention an intermediate smaller tine may be located between the two tines.

EMBODIMENT OF THE INVENTION

Embodiments of the invention are described with reference to the accompanying drawings, in which.

Figure 1:
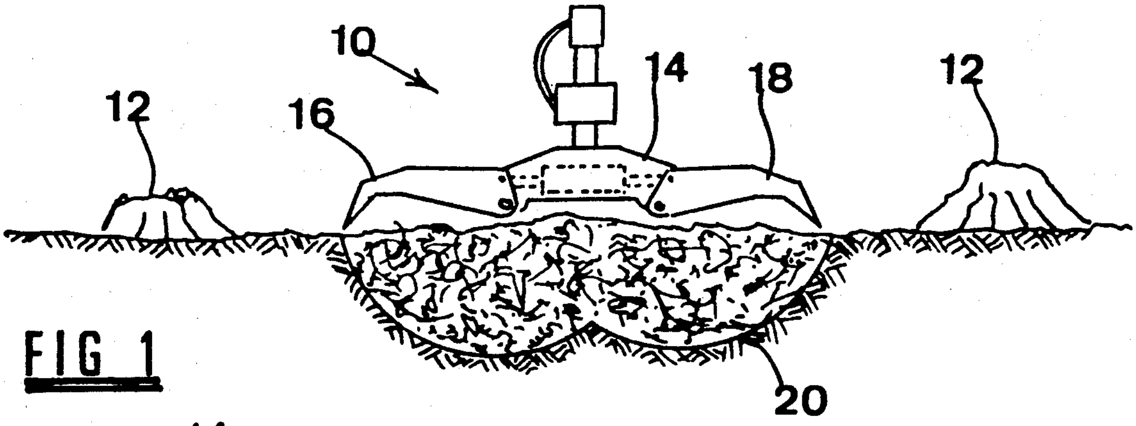
FIG. 1 is a diagrammatical representation of apparatus according to the invention illustrating the method of ameliorating soil.

Referring first to FIG. 1, a grapple 10 is provided which may be used between existing rows of stumps 12. The grapple has a body 14 with opposed tines 16, 18 which move in areas as shown by line 20. The volume of soil contained between the tines is disturbed and the pattern of disturbance is shown more clearly in FIG. 14. In addition to the simple arch shown in FIG. 1 it will be appreciated that there is also a downward movement for a resultant path to be constituted, the actual path depending on the shape of the tines.

Figure 2:
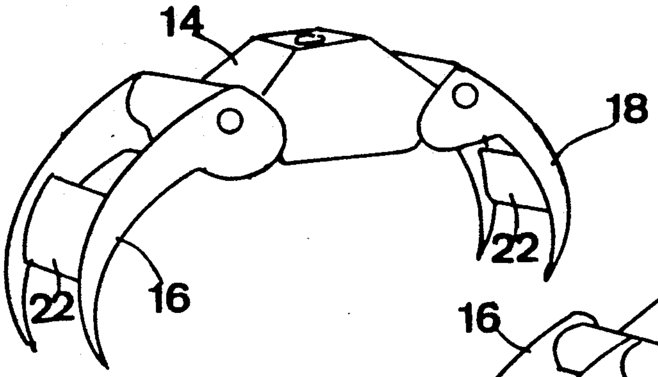
FIGS. 2,3,4,6,7 and 8 are isometric views of alternative forms of the apparatus.

In FIG. 2, two pair of tines 16 and 18 provided with weds 22 which assist the disturbance of the soil and, should it be felt necessary to lift the soil for greater aeration, will assist in such lift.

Figure 3:
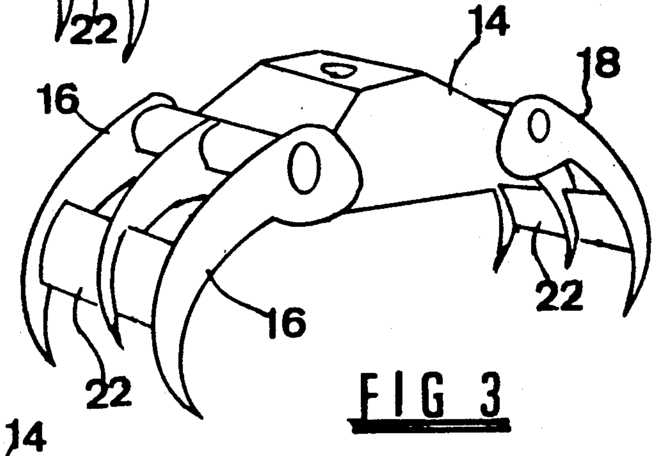
Figure 4:
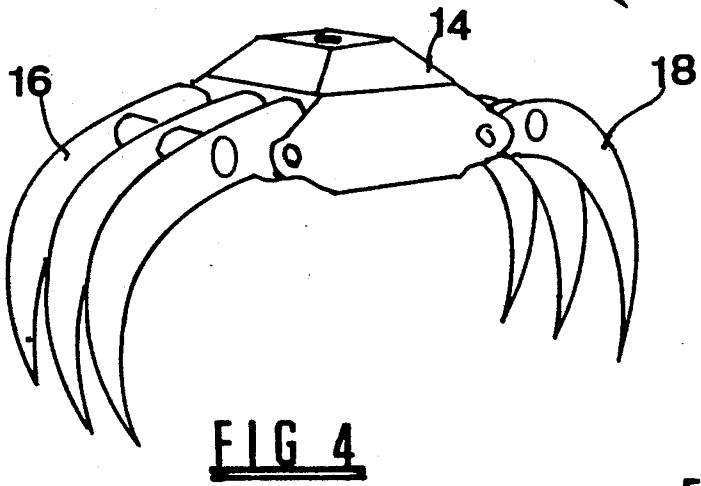
Figure 11:
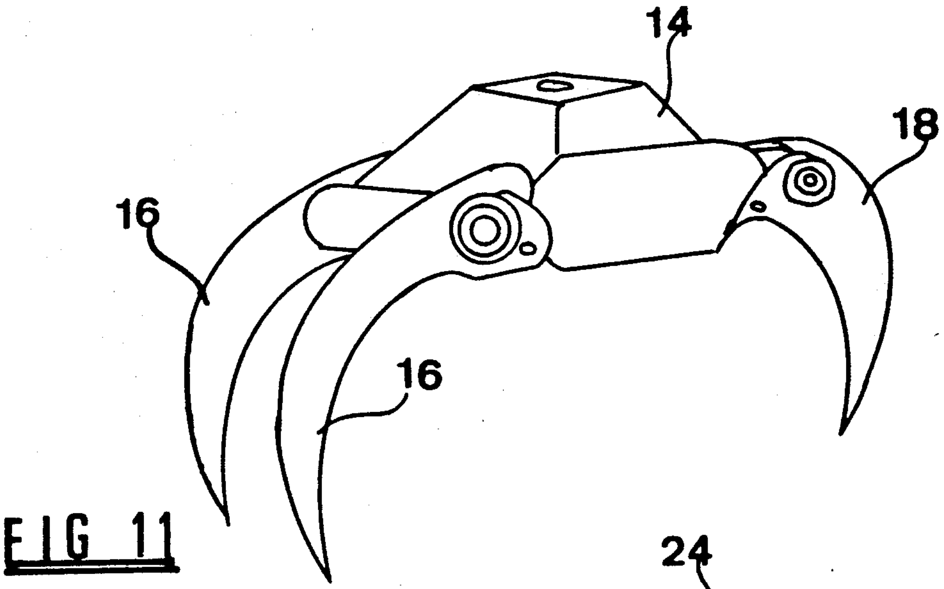
FIG. 11 is an isometric view of another form of apparatus.

FIG. 3 shows apparatus having three tines on each side of the body 14 and two weds 22. It will be appreciated that more tines may be provided and, of course, the weds may be omitted, for example in FIGS. 4 and 11. In the letter, there is a pair of tines 16 on one side and a single tine 18 on the other.

Figure 5:
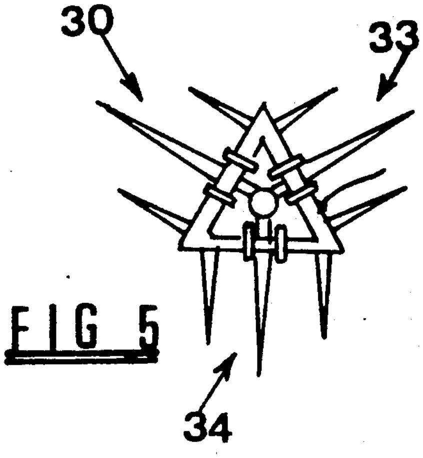
FIG. 5 is a plan view of another alternative form.
Figure 6:
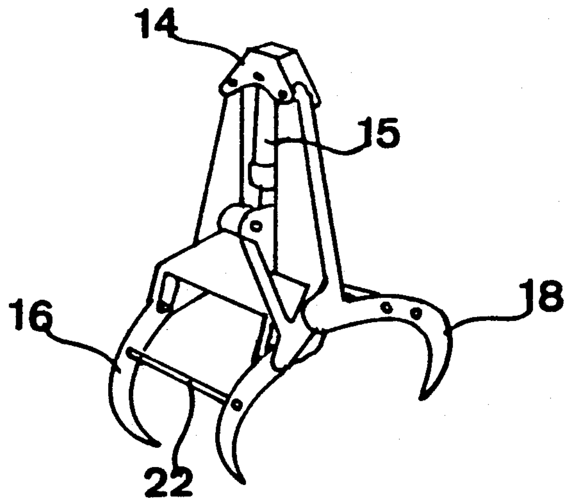
Figure 7:
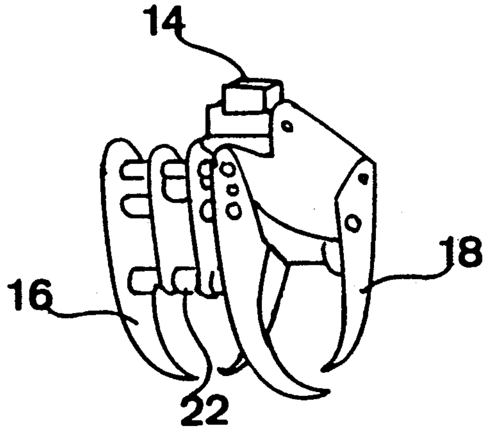
Figure 8:
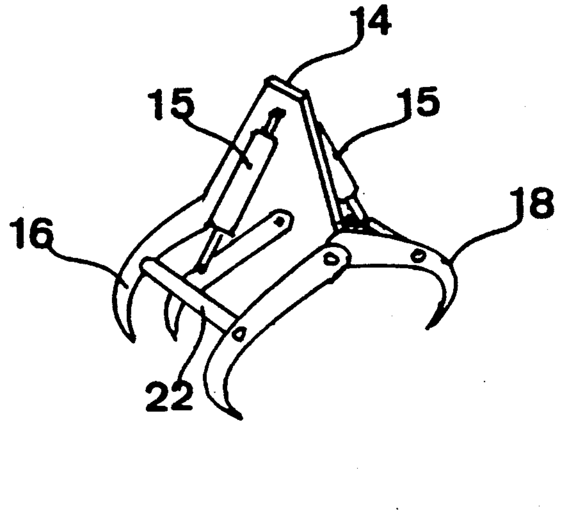
Figure 10:
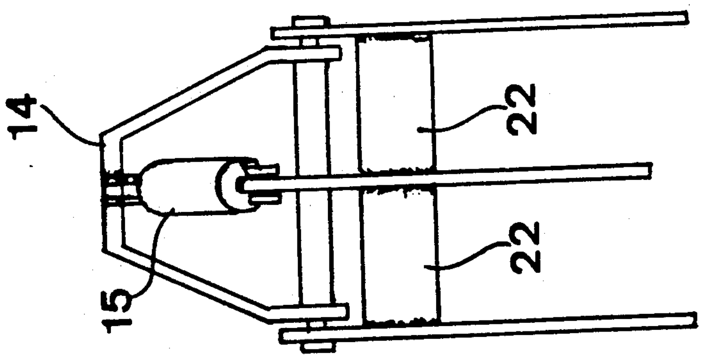
FIGS. 9 and 10 are two views of a preferred form of apparatus, in side view and end view respectively.
Figure 9:
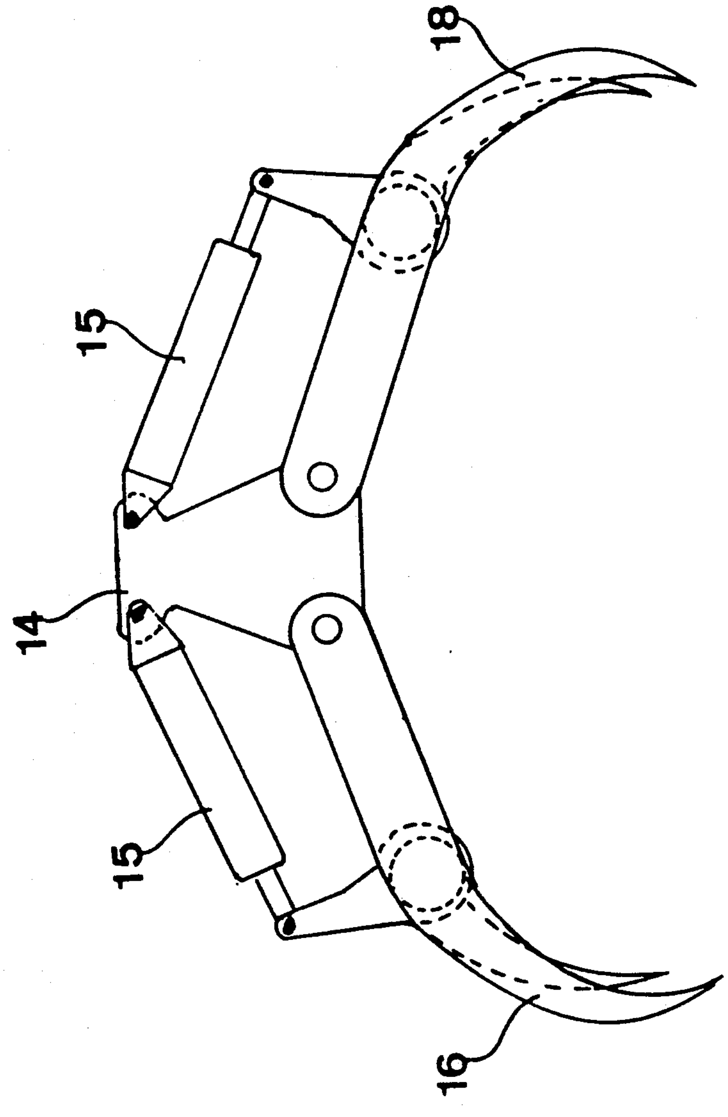

FIG. 5 shows apparatus having three sets of tines 30,32 and 34 mounted on body 36 and it will be appreciated that it is possible to have any reasonable number of sets of tines in order forms of the invention.

FIGS. 6 to 10 show apparatuses which include hydraulic rams 15, while the tines webs are referenced as in the other drawings.

Figure 12:
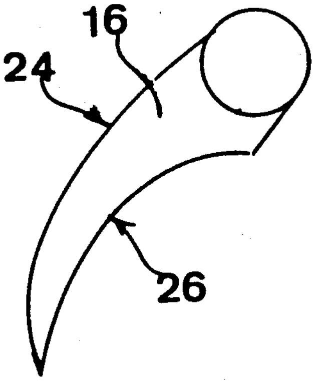
FIGS. 12 and 13 illustrate a particular shape of tine and the path taken by the tip.
Figure 13:
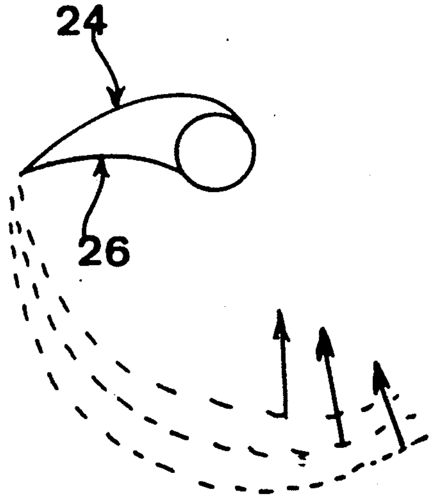
Figure 14:
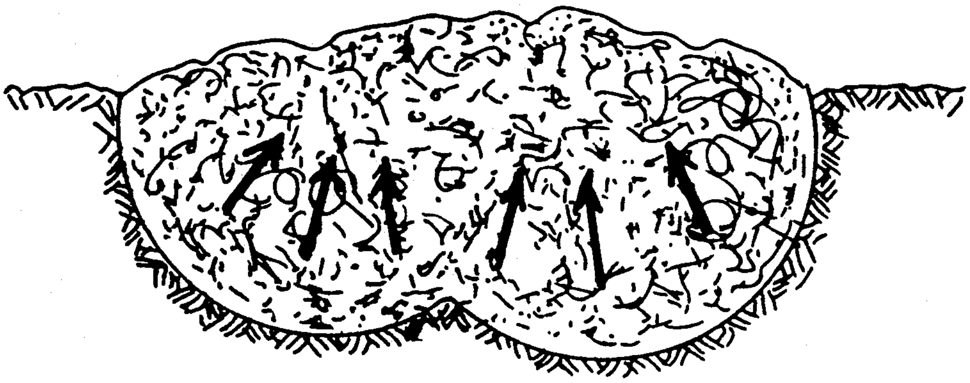
FIG. 14 illustrates the disturbance pattern of soil.

Turning now to FIG. 12, the curvature 24 of the convex surface of the tine 16 has a greater radius than that of the concave surface 26. This eccentric arrangement, with the concave surface 26 providing lift to the soil and the convex surface providing an eccentric pattern as shown in FIG. 13, results in the desired effect as shown in FIG. 14.

I claim:

1. A method of preparing land for tree planting including the step of ameliorating a number of separate zones of soil in a predetermined formation for the planting of seedlings, cuttings or slips in such zones, said ameliorating step comprising grappling the soil in each selected zone to the extent of about a square meter in area and a depth of between about 25 and 75 cm and then allowing the soil to fall back into the zone in its resulting ameliorated state to re-occupy the volume which it was grappled.

2. The method as claimed in claim 1 in which the zones are located between stumps remaining after tree fellimg.

3. The method as claimed in claim 2 in which the zones are arranged in rows.

* * * * *